US009691293B2

(12) United States Patent
Arnold et al.

(10) Patent No.: US 9,691,293 B2
(45) Date of Patent: Jun. 27, 2017

(54) CUSTOMIZING APPLICATION USABILITY WITH 3D INPUT

(71) Applicant: Pearson Education, Inc., Upper Saddle River, NJ (US)

(72) Inventors: Brent Douglas Arnold, American Fork, UT (US); Darvell Dean Hunt, Saratoga Springs, UT (US); Amanda Luisa Figueroa, West Jordan, UT (US); CrisAnn Peterson, Bingham Canyon, UT (US)

(73) Assignee: PEARSON EDUCATION, INC., Upper Saddle River, NJ (US)

( * ) Notice: Subject to any disclaimer, the term of this patent is extended or adjusted under 35 U.S.C. 154(b) by 114 days.

(21) Appl. No.: 14/327,387

(22) Filed: Jul. 9, 2014

(65) Prior Publication Data

US 2016/0012740 A1    Jan. 14, 2016

(51) Int. Cl.
| | |
|---|---|
| *G06F 3/00* | (2006.01) |
| *G09B 5/12* | (2006.01) |
| *G06F 3/01* | (2006.01) |
| *G09B 5/06* | (2006.01) |
| *G09B 21/00* | (2006.01) |

(52) U.S. Cl.
CPC ............... *G09B 5/12* (2013.01); *G06F 3/011* (2013.01); *G06F 3/017* (2013.01); *G09B 5/06* (2013.01); *G09B 21/00* (2013.01)

(58) Field of Classification Search
CPC ...................................................... G06F 3/005
See application file for complete search history.

(56) References Cited

U.S. PATENT DOCUMENTS

| | | |
|---|---|---|
| 5,347,295 A | 9/1994 | Agulnick et al. |
| 2005/0093817 A1 | 5/2005 | Pagan |
| 2005/0210417 A1 | 9/2005 | Marvit et al. |
| 2005/0275638 A1 | 12/2005 | Kolmykov-Zotov et al. |
| 2008/0246734 A1 | 10/2008 | Tsui et al. |
| 2010/0277411 A1 | 11/2010 | Yee et al. |
| 2011/0093820 A1* | 4/2011 | Zhang ................. A63F 13/06 715/863 |
| 2013/0300644 A1 | 11/2013 | Chen |
| 2014/0009378 A1* | 1/2014 | Chew ................... G06F 3/017 345/156 |
| 2014/0055349 A1* | 2/2014 | Itoh ....................... G09G 3/36 345/156 |
| 2014/0267022 A1 | 9/2014 | Kim |

OTHER PUBLICATIONS

U.S. Appl. No. 14/327,396 filed Jul. 9, 2014, all pages.
"Explore the World in a Whole New Way." *Leap Motion Buy.* Leap Motion, 2014. Retrieved from https://www.leapmotion.com/product on Aug. 19, 2014, all pages.

(Continued)

*Primary Examiner* — Alexander Eisen
*Assistant Examiner* — Cory Almeida
(74) *Attorney, Agent, or Firm* — Kilpatrick Townsend & Stockton LLP

(57) ABSTRACT

Generally, embodiments of the disclosure are directed to methods, computer-readable medium, servers, and systems for providing customized instructional content through an application using three-dimensional input and providing feedback from an interaction with the instructional content.

24 Claims, 12 Drawing Sheets

(56) References Cited

OTHER PUBLICATIONS

Non-Final Office Action dated Sep. 25, 2015, for U.S. Appl. No. 14/327,396, 16 pages.
Final Office Action mailed Feb. 23, 2016, for U.S. Appl. No. 14/327,396, 17 pages.
Notice of Publication mailed Jan. 14, 2016, for U.S. Appl. No. 14/327,396, 1 page.
Non-Final Office Action mailed Jun. 27, 2016, for U.S. Appl. No. 14/327,396, 12 pages.
Final Office Action mailed Sep. 14, 2016, for U.S. Appl. No. 14/327,396, 14 pages.

* cited by examiner

CUSTOMIZING APPLICATION USABILITY WITH 3D INPUT

BACKGROUND

Some users have difficulty interacting with software applications, because of limits associated with the application or other usability restrictions. For example, the application may require a user to operate a mouse to click a play button or tap their finger on a play button to start watching a movie through the application. However, some users do not have use of their fingers to click or tap the play button and the application may not provide an alternative to activate the play button. Other users may not be able to see the play button.

SUMMARY

Aspects of the invention relate to a computing device and computer-implemented method for providing customized instructional content through an application using three-dimensional input. The processor to receive a first profile associated with a plurality of users and commands. The commands can interact with the instructional content. The user (e.g., an appendage of the user) can provide three-dimensional input by moving their appendage in a three-dimensional space to generate three-dimensional input and associate the movement with a first command. A second profile may be generated for the user using such movement, so that when the computing device receives the movement, a command can be initiated on the application according to the second profile for the user.

Other features, advantages, and objects of the present invention will be apparent to those skilled in the art with reference to the remaining text and drawings of this application.

Figure 1:
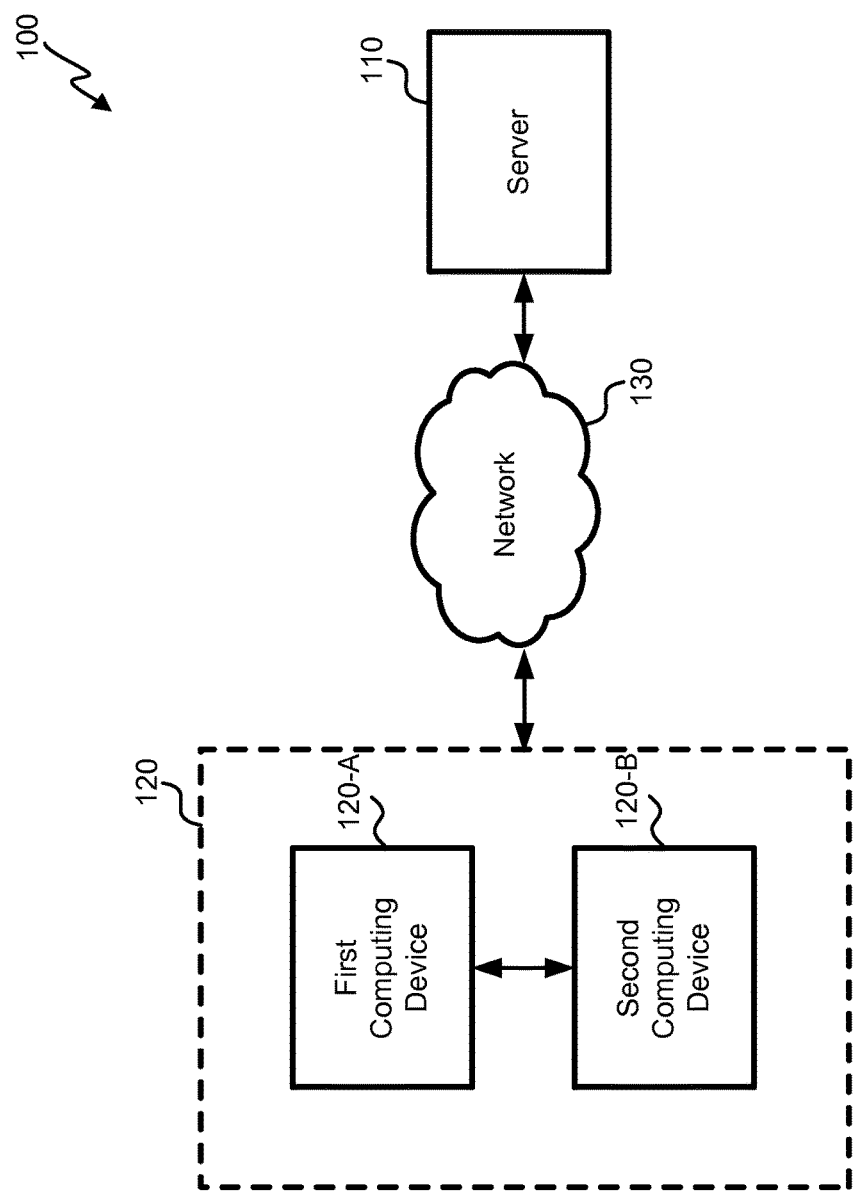
FIG. 1 illustrates an example architecture for providing customized instructional content and/or feedback through an application using three-dimensional input described herein that includes at least a server, a first computing device, and a second computing device, according to at least one example.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

In the appended figures, similar components and/or features may have the same reference label. Where the reference label is used in the specification, the description is applicable to any one of the similar components having the same reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

In one embodiment, the present disclosure provides a computing device for providing customized instructional content through an application using three-dimensional input. This computing device includes, for example, a processor and memory. The processor is configured to receive a first profile. The first profile may be associated with a plurality of users and comprise a plurality of commands associated with the three-dimensional input. The plurality of commands can include a first command and a second command, and interact with the instructional content. The processor may receive the three-dimensional input, which can be provided by an appendage of a user. The appendage of the user can move in a three-dimensional space to generate the three-dimensional input, and the movement includes a start of the movement by the appendage and an end of the movement by the appendage. The processor may determine that the three-dimensional input corresponds with the first command and generate a second profile for the user. The second profile may be based in part on the first profile and correspond with the user. The three-dimensional input can replace information originally associated with the first command. A second three-dimensional input can be received. The processor may determine that the second three-dimensional input is from the user and initiate the first command on the application according to the second profile for the user.

An embodiment of the present disclosure also relates to a computing device or computer-implemented method for providing customized instructional content through an application using three-dimensional input. The computing device includes a processor and memory device including instructions that, when executed by the processor, cause the processor to receive a first profile. The first profile may be associated with a plurality of users and comprises a plurality of commands associated with the three-dimensional input. The plurality of commands can include a first command and a second command, and the plurality of commands interact with the instructional content. The three-dimensional input may be received when the three-dimensional input is provided by an appendage of a user. The appendage of the user may move in a three-dimensional space to generate the three-dimensional input and the movement includes a start of the movement by the appendage and an end of the movement by the appendage. The three-dimensional input may be determined to correspond with the first command. A second profile may be generated for the user. The second profile can be based in part on the first profile and correspond with the user. The three-dimensional input may replace information originally associated with the first command. Second three-dimensional input may be received and determined that the second three-dimensional input is from the user. The first command may be initiated on the application according to the second profile for the user.

An embodiment of the present disclosure also relates to a computing device or computer-implemented method for providing feedback from an interaction with instructional content. The computing device includes a processor and memory device including instructions that, when executed by the processor, cause the processor to receive a profile. The profile includes a command associated with pre-defined three-dimensional input. Three-dimensional input may be received as well. The three-dimensional input can be provided by a user, such that the user performs a movement in a three-dimensional space that is associated with the three-dimensional input. The movement can include a start of the movement and an end of the movement to create the three-dimensional input. The three-dimensional input may be determined to correspond with the profile. Pre-defined three-dimensional input may be compared with the three-dimensional input provided by the user and feedback can be provided to the user. The feedback can confirm that the three-dimensional input provided by the user corresponds with the pre-defined three-dimensional input. A command may be initiated with the application according to the profile.

In one embodiment, the present disclosure provides a computing device for providing feedback from an interaction with instructional content. This computing device includes, for example, a processor and memory. The processor is configured to receive a profile. The profile may include a command associated with pre-defined three-dimensional input. Three-dimensional input may be received. The three-dimensional input can be provided by a user. The user can perform a movement in a three-dimensional space that is associated with the three-dimensional input. The movement can include a start of the movement and an end of the movement to create the three-dimensional input. The processor may determine that the three-dimensional input corresponds with the profile and compare the pre-defined three-dimensional input with the three-dimensional input provided by the user. Feedback may be provided to the user that confirms that the three-dimensional input provided by the user corresponds with the pre-defined three-dimensional input. The command may be initiated with the application according to the profile.

An embodiment of the present disclosure also relates to a computer-implemented method for providing feedback from an interaction with instructional content. This computing device includes, for example, receiving a profile. The profile includes a command associated with pre-defined three-dimensional input. Three-dimensional input may be received as well. The three-dimensional input can be provided by a user, such that the user performs a movement in a three-dimensional space that is associated with the three-dimensional input. The movement can include a start of the movement and an end of the movement to create the three-dimensional input. The three-dimensional input may be determined to correspond with the profile. Pre-defined three-dimensional input may be compared with the three-dimensional input provided by the user and feedback can be provided to the user. The feedback can confirm that the three-dimensional input provided by the user corresponds with the pre-defined three-dimensional input. A command may be initiated with the application according to the profile.

An embodiment of the present disclosure also relates to a computer-readable storage medium storing computer-executable instructions that, when executed by a processor, cause the processor to perform operations for providing customized instructional content through an application using three-dimensional input. The operations include receiving a first profile. The first profile may be associated with a plurality of users and comprises a plurality of commands associated with the three-dimensional input. The plurality of commands can include a first command and a second command, and the plurality of commands interact with the instructional content. The three-dimensional input may be received when the three-dimensional input is provided by an appendage of a user. The appendage of the user may move in a three-dimensional space to generate the three-dimensional input and the movement includes a start of the movement by the appendage and an end of the movement by the appendage. The three-dimensional input may be determined to correspond with the first command. A second profile may be generated for the user. The second profile can be based in part on the first profile and correspond with the user. The three-dimensional input may replace information originally associated with the first command. Second three-dimensional input may be received and determined that the second three-dimensional input is from the user. The first command may be initiated on the application according to the second profile for the user.

With reference now to FIG. 1, a block diagram of one embodiment of a system for providing customized instructional content and/or feedback through an application using three-dimensional input is shown. The system 100 includes example architecture, including server 110, computing device 120, and network 130.

The system 100 includes a server 110. The server 110 is configured to provide instructional content to the computing device 120 and receive instructional content from the computing device 120. It should be appreciated that one or more of these configurations may also be implemented in computing device 120. Details and features of one type of server 110 are provided in association with FIG. 2.

The system 100 includes a computing device 120. The computing device 120 may be implemented as a first computing device 120-A and a second computing device 120-B, or as a single computing device 120 (used interchangeably to identify computing device 120). For example, the first computing device 120-A can include a display to show a user instructional content and feedback associated with a user's three-dimensional input, and the second computing device 120-B can include a sensor to accept the three-dimensional input. The computing device 120 can also be configured to include the display and sensor in the same device. Details and features of some types of a computing device 120 are provided in association with FIG. 3.

The system 100 also includes a network 130. The network 130 include wired or wireless connections to one or more intranets (e.g., located within the geographic area of the server 110 and/or computing device 120), one or more internets (e.g., located within and outside of the geographic area of the server 110 and/or computing device 120), public or private channels, communication tunnels between one or more servers, or other means of communication. The network 130 may include encryption or other forms of protection to help secure the three-dimensional feedback, profile(s), user data, and other information that is transmitted and received between the server 110 and computing device 120.

Figure 2:
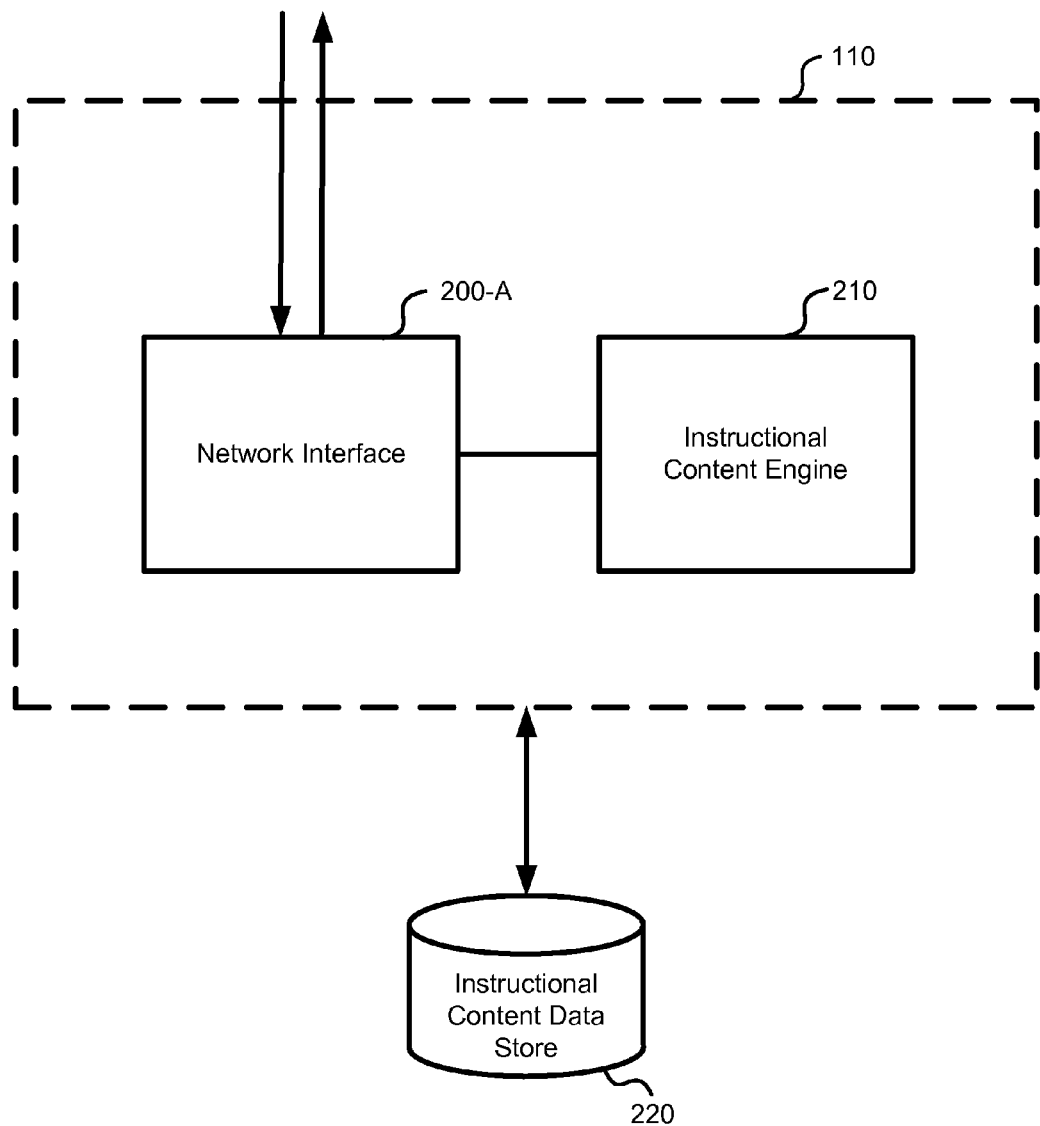
FIG. 2 illustrates an example architecture of a server with one or more data stores, according to at least one example.

With reference now to FIG. 2, a block diagram of one embodiment of a server 110 for providing customized instructional content and/or feedback through an application using three-dimensional input is shown. For example, the server 110 includes a network interface 200, an instructional content engine 210, and one or more data stores, including an instructional content data store 220. It should be appreciated that one or more of these aspects can also or alternatively be implemented with the computing device 120.

As depicted in FIG. 2, the server 110 includes a network interface 200-A (hereinafter identified as network interface 200). The network interface 200 allows the devices, networks, and other systems to access the other components of the system 100. The network interface 200 includes features configured to send and receive information, including, for example, a network antenna, a modem, a transmitter, receiver, network adapter, or any other feature that can send and receive information. The network interface 200 can communicate via telephone, cable, fiber-optic, and other wired communication network, including network 130. In some embodiments, the network interface 200 communicates via cellular networks, WLAN (wireless local area networking) networks, or any other wireless network.

The network interface 200 can also be configured to send and receive data. In some embodiments, the network interface 200 sends and receives instructional content for a computing device 120. For example, when a user is authenticated at a computing device 120, the network interface transmits the instructional content (e.g., test questions, lesson plans, instructions, learning materials, etc.) to the computing device 120. In another example, the computing device 120 transmits the instructional content (e.g., test answers, status of a user in relation to receiving the instructional content, etc.) to the server 110.

The server 110 also includes an instructional content engine 210. The instructional content engine 210 is configured to generate and/or receive instructional content. When generated, the instructional content engine 210 may help create the test questions, lesson plans, instructions, learning materials, etc. by providing a software application that is used to generate the instructional content (e.g., to received typed words or an image of a chapter of a textbook from a user, to create a video of audio/visual content, etc.). When the instructional content is received, the instructional content engine 210 may receive the instructional content from a publication server, a publisher, an instructor/teacher, or other source that generates the instructional content and sends the instructional content to the server 110 for distribution.

Figure 7:
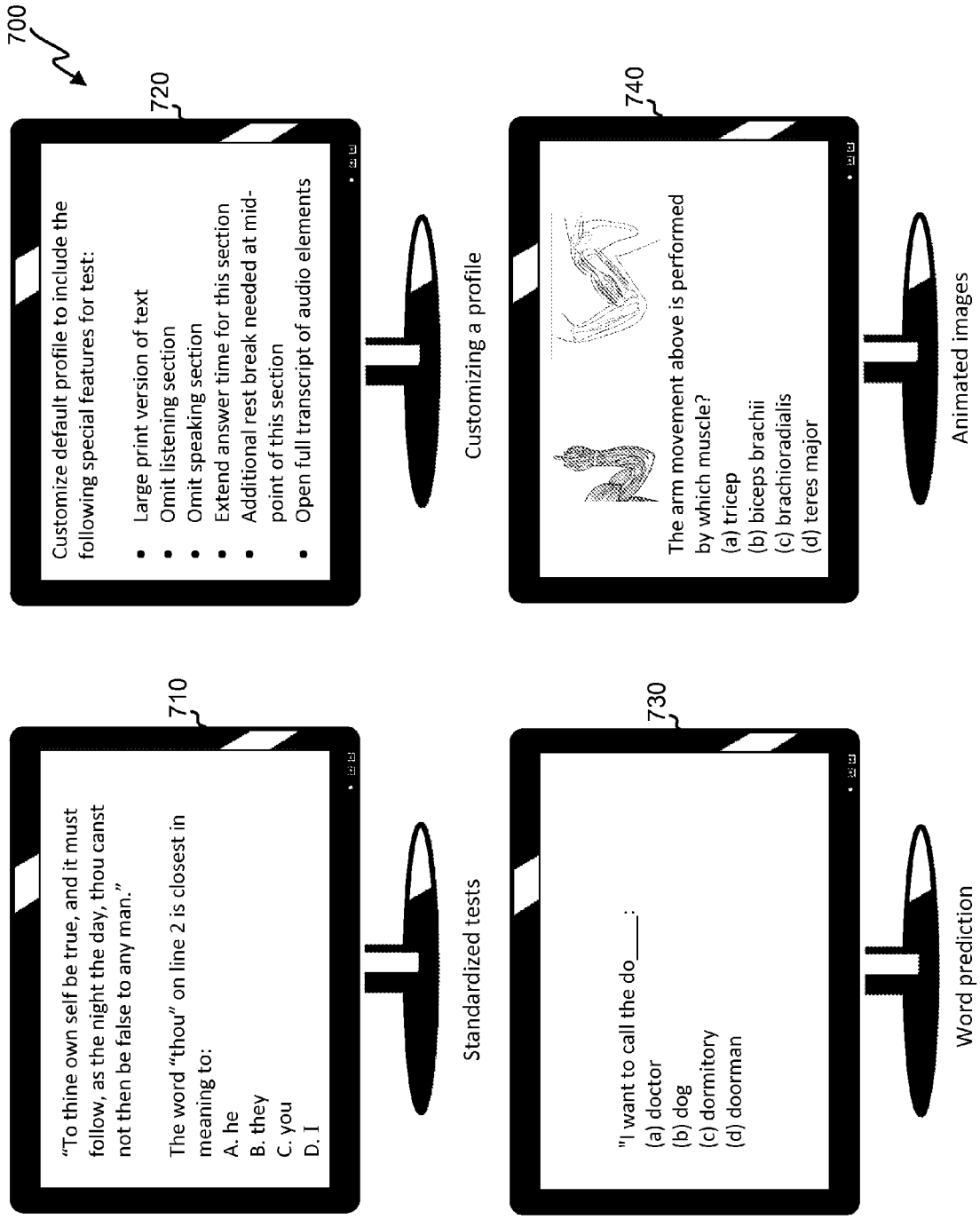
FIG. 7 illustrates examples of instructional content described herein, according to at least one example.

The server 110 also interacts with one or more data stores, including an instructional content data store 220. The data stores are associated with a distributed or local data system accessible by the server 110. For example, the engines or modules provided by the server 110 (e.g., instructional content engine 210) provide requests for information that may be stored in one or more of the data stores. The instructional content data store 220 can store the instructional content that is accessed by the instructional content engine 210. Additional examples of instructional content that may be stored in the instructional content data store 220 are shown in FIG. 7.

Figure 3:
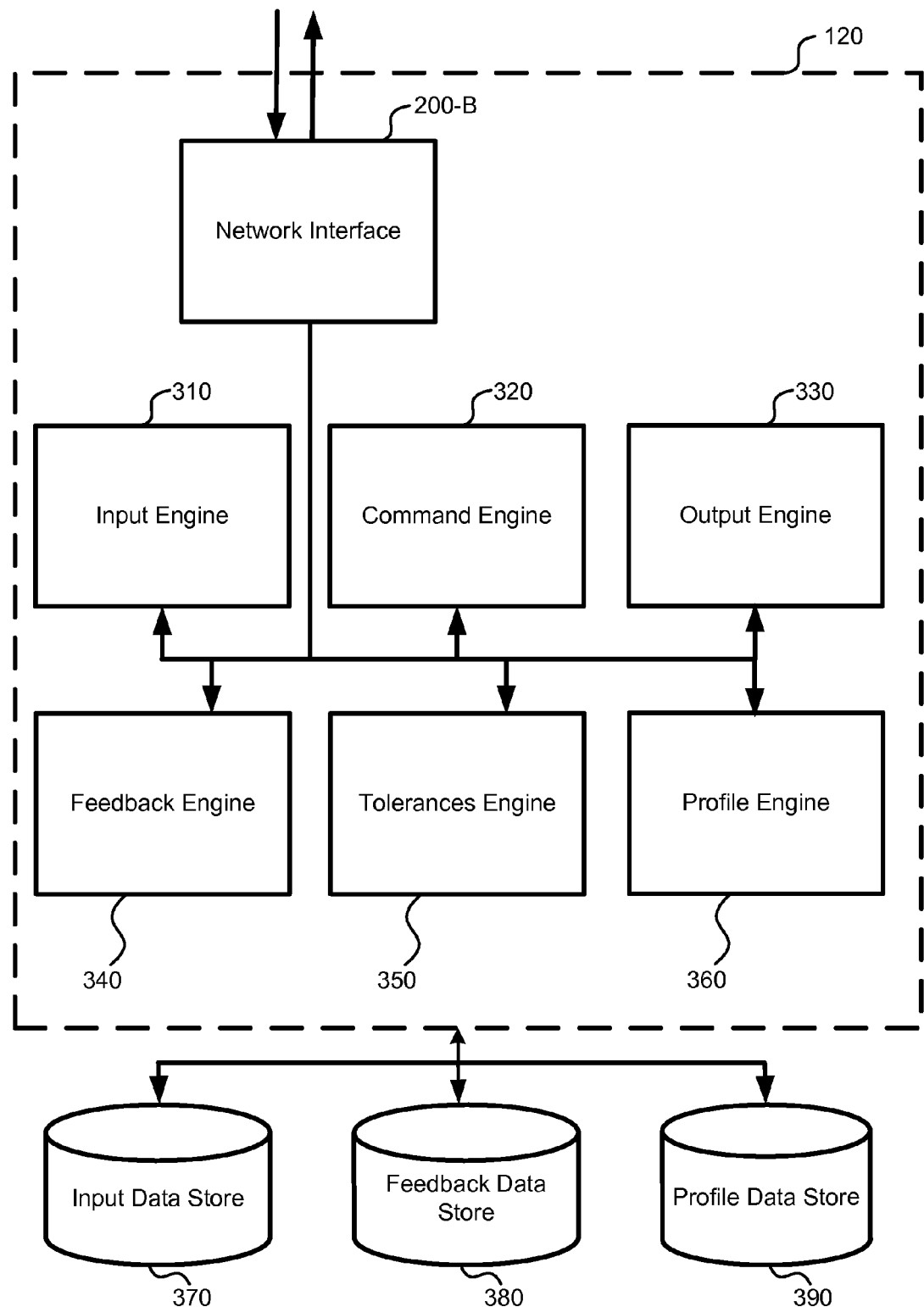
FIG. 3 illustrates an example architecture of one or more computing devices, according to at least one example.

With reference now to FIG. 3, a block diagram of one embodiment of one or more computing devices for providing customized instructional content and/or feedback through an application using three-dimensional input is shown. For example, the computing device 120 includes a network interface 200-B (hereinafter network interface 200), input engine 310, command engine 320, output engine 330, feedback engine 340, tolerances engine 350, profile engine 360, and one or more data stores, including an input data store 370, feedback data store 380, and profile data store 390. It should be appreciated that one or more of these aspects can also or alternatively be implemented at the server 110.

The computing device 120 includes an input engine 310. The input engine 310 can receive three-dimensional input. For example, the input engine 310 receives the three-dimensional input in a 20-inch area of space adjacent to the computing device 120 (e.g., cone, a field of view, depth of field, etc.), such that any object in the space is recognized as the three-dimensional input. In another example, the input engine 310 receives a start and an end to a movement in a 6-foot window of space adjacent to the computing device 120. Other areas of space adjacent to the computing device 120 are acceptable without diverting from the scope of the disclosure.

The input engine 310 can accept the three-dimensional input as various forms of data. For example, the three-dimensional input may include a wire-frame that replicates a movement of an appendage of the user (e.g., a wire frame of a hand in motion). In another example, the three-dimensional input is one or more absolute values of an appendage of the user in space (e.g., start of movement is at 1:1:1 and end of movement is at 50:25:50). The three-dimensional input can include complete movements.

The three-dimensional input can include information in addition to movements of the user. For example, the input engine 310 receives the color of skin, birthmarks, or other identifying characteristics of the user that are visible in the space adjacent to the computing device 120. The input engine 310 may recognize measurements as three-dimensional input, including a length or width of a finger, the number of ridges or marks on a finger, the length between a user's elbow and hand, and the like. The three-dimensional input may also recognize individual appendages of the user or whether the user is missing appendages. For example, when the user provides a first in the space adjacent to the computing device 120, the three-dimensional input can include the number of fingers the user has with the fist.

The input engine 310 may receive the three-dimensional input from a second computing device and recognize the data provided by the second computing device as three-dimensional input. For example, the second computing device may recognize a movement by the user and translate the movement to a different form of data (e.g., wire-frame, one or more absolute values, a description of the movement like "pointing with index finger," an American Sign Language symbol for the letter "L," etc.). The three-dimensional input and/or translated movement of the user can be received by the input engine 310 and recognized as three-dimensional input.

The computing device also includes a command engine 320. A command can interact with the instructional content. For example, a "play" command interacts with video instructional content by playing the video, such that when the command is received, the video plays. The command engine 320 may be configured to receive the command and implement the corresponding action (e.g., "play" command initiates the play.exe action).

The command engine 320 may also be configured to correlate three-dimensional input (e.g., received from the input engine 310) with a command. For example, when the input engine 310 receives a finger pointing at a screen associated with the computing device 120, the command engine 320 can recognize the three-dimensional input as the "play" command. In another example, the three-dimensional input includes the American Sign Language letters for "p" "l" "a" "y" which correspond with the play command. In the example where a series of commands is received (e.g., the letters in the word "play"), the computing device may correlate the series of commands as a single command (e.g., when received consecutively at the computing device, when received between the start of a movement and an end of the movement, when the letters are provided as three-dimensional input by a second computing device, etc.).

In some examples, the command engine 320 is configured to determine that the three-dimensional input corresponds with customizing a command for a user. For example, a user wants to associate a first punching at the computing device as a "play" command instead of a finger pointing (e.g., the user does not have use of their fingers, the user does not have fingers, the user prefers punching instead of pointing, etc.). The command engine 320 can receive a notification to associate the three-dimensional input with the command for the user (e.g., in a settings display, during a customization or enrollment process, etc.). The command engine 320 can interact with other engines (e.g., the provide engine 360) and/or any data stores to generate the profile for the user (e.g., the second profile) that replaces information originally associated with the command. For example, the first profile associates the play command with pointing and the second profile associates the play command with punching.

The computing device 120 also includes an output engine 330. The output engine 330 is configured to determine how to provide information to the user. For example, the output can be based on the user's profile. The profile (e.g., stored in the profile data store 390) may identify the user as hearing-impaired and cause the output engine 330 to associate the profile with visual feedback to the user.

The output engine 330 is also configured to determine which feedback to provide to the user in response to the three-dimensional input and/or command. For example, when the profile identifies the user as hearing impaired, the feedback can include a visual identification of the command instead of or in addition to an audio feedback. In another example, the feedback can provide a visual representation of the three-dimensional input (e.g., in a wire frame of an appendage used to provide the three-dimensional input).

The output engine 330 is also configured to provide instructional content for a user based on the profile. For example, the instructional content (e.g., a test) is received from a server 110 and the output engine 330 displays the instructional content for a user. Based on the profile for the user, the instructional content can be slowed or otherwise adjusted to correspond with the profile.

In some examples, the instructional content is provided in response to a command. For example, the user provides a particular command to navigate through the instructional content. The profile may identify that the user should receive content at a slower pace. The speed of providing the instructional content can be altered based on the profile. In another example, the profile identifies that the user is blind and the instructional content received from the server may be visual. The computing device may convert the instructional content to an audio format for a blind user and provide the instructional content in an altered format based on the profile.

Figure 8A:
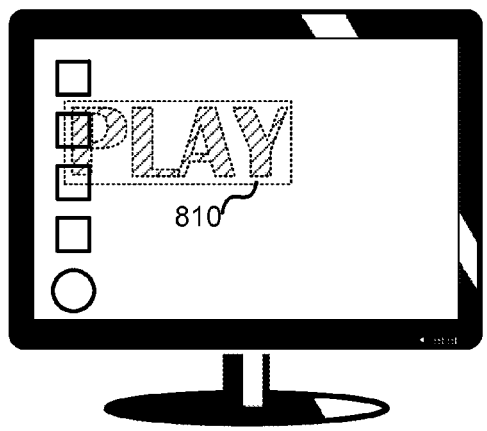
FIGS. 8A, 8B, and 8C illustrate examples of feedback described herein, according to at least one example.
Figure 8B:
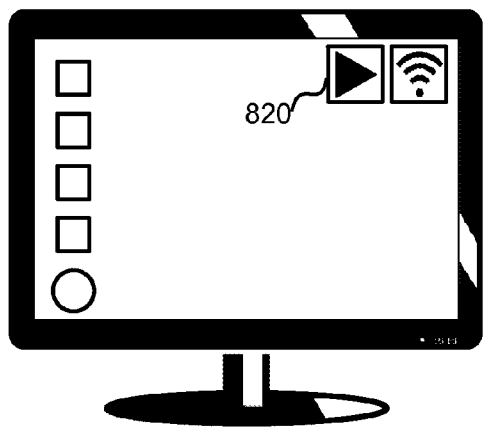
Figure 8C:
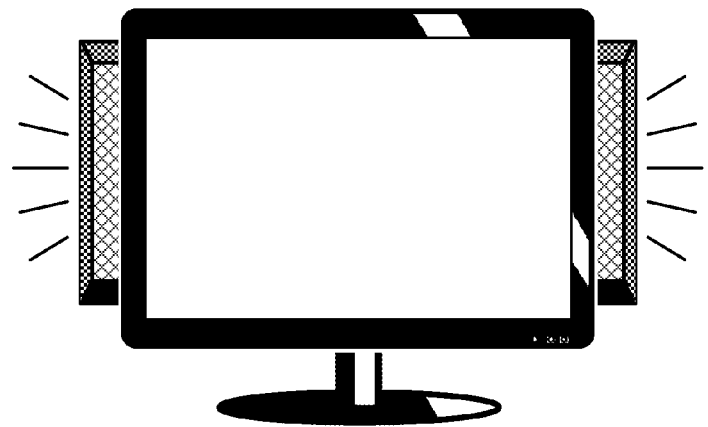

The computing device 120 also includes a feedback engine 340. The feedback engine 340 is configured to provide feedback to the user through the computing device 120. For example, the computing device 120 provides feedback to the user that identifies the three-dimensional input received, command instructed, or other information. The feedback can be displayed visually, provided through sound, or other methods of providing feedback. Additional examples of output methods are shown in FIGS. 8A-8C.

The feedback engine 340 is also configured to provide feedback to the user that confirms the three-dimensional input provided by the user. For example, the feedback may be a colored icon (e.g., green arrow), a fading visual representation of the three-dimensional input, an audio confirmation (e.g., "accepted" or "received play command"), or combination of audio and visual feedback that identifies that the three-dimensional input was accepted. The feedback can identify the command of the user with respect to the three-dimensional input.

The feedback engine 340 is also configured to clarify a command provided by the user. For example, the user provides three-dimensional input as two fingers pointing at the computing device 120. The feedback displays the three-dimensional input received (e.g., a wire-frame of the two fingers, a text description explaining the received command, etc.) and one or more options of a command. In this example, the options may include a single finger pointing at the computing device that corresponds with a "play" command and three-fingers pointing at the computing device that corresponds with a "stop" command. The user may select the appropriate or intended command and the computing device can initiate the command on the application that is providing the instructional content (e.g., by pointing at the correct command, by typing or speaking the intended command, by repeating the initial three-dimensional input, etc.).

The feasibility of the command may also be analyzed. For example, a series or plurality of commands to "play," "erase," and "play" may not be recognized as valid commands, because the plurality of commands is unlikely. The user would probably not erase instructional content and then ask to play the instructional content after the instructional content is erased. In some examples, the feedback may also confirm the corresponding commands and/or offer undo commands.

The computing device 120 also includes a tolerances engine 350. The tolerances engine 350 is configured to define the area around the computing device that can recognize three-dimensional input. For example, the tolerances engine 350 may define the range of area able to accept the three-dimensional input to a particular threshold (e.g., 15-inches around a sensor associated with the computing device, 10-feet around the sensor, etc.). Various other ranges of area are available without diverting from the scope of the disclosure.

The tolerances engine 350 is configured to expand or limit the area around the computing device that can recognize three-dimensional input. For example, when a default area around the device is 20-inches, the computing device may expand the area to 25-inches to allow the user space to provide the three-dimensional input. In some examples, the computing device may be moved closer to the user instead of adjusting the area around the computing device that can recognize three-dimensional input. In another example, the tolerances engine 350 can expand the range of area able to accept the three-dimensional input and implement a filter to remove extraneous three-dimensional input. In yet another example, the area can be limited to remove particular areas around the computing device that provide extraneous movements (e.g., a hallway, a window, etc.).

The tolerances engine 350 is also configured to determine a confidence value that command is from the user. For example, a confidence value of 100 may identify that the computing device is mathematically certain that the command is from the user. A confidence value of 10 may identify that the computing device is mathematically uncertain whether the command is from the user. Other values or measurements are acceptable as well, including ranges (e.g., 50-60 is certain), percentages (e.g., 90% and above is certain), textual values (e.g., "acceptable" or "yes"), and the like.

The confidence value can analyze three-dimensional input to determine whether the command is from the user. For example, the user may provide three-dimensional input using their fingers and pointing at the screen for a "play" command. The confidence value associated with the command may be higher when the computing device senses that the fingers are attached to a hand, which is attached to an arm, and so on. The hand may originate from a position adjacent to the computing device, which is likely where the user would sit/stand. The confidence value may be lower if the three-dimensional input is received from a floating object (e.g., a fly), an object without an accompanying arm (e.g., a ceiling fan), or from a source that is not adjacent to the computing device (e.g., from a user passing by the computing device).

The confidence value may also consider a profile. For example, a profile for a user identifies the user as having seven fingers and a purple finger on their left hand. The three-dimensional input may be received from a user with ten fingers that are all blue. The tolerances engine 350 is also configured to determine a low confidence value because the user would not be expected to grow fingers and/or change the color of their skin, and thus it would be unlikely that the three-dimensional input is provided by the particular user associated with the profile.

The tolerances engine 350 can also adjust the three-dimensional input based in part on the user profile. For example, a user's finger customarily shakes when the three-dimensional input is received. The shaking can be identified in the profile and the three-dimensional input can correspond with the finger without the shaking and/or not accept input from a user if the user's finger is not shaking The computing device 120 also includes a profile engine 360. The profile engine 360 is configured to identify a user. The user may be identified by a user name, identifier (e.g., login or profile identifier, computing device identifier, etc.), a session identifier (e.g., associate a session identifier with a user while they are using a particular network browser/application), attributes or characteristics of a user (e.g., width of arm, length of torso, etc.), sound of the user's voice, or other identifying characteristics.

The profile engine 360 can identify various physical characteristics of the user. For example, a user may be missing a finger or the use of their fingers. The profile engine 360 can exclude an individual operating the computing device as the user associated with a particular profile when the individual has use of their fingers. The computing device may also or alternatively filter three-dimensional input from that individual and not implement a corresponding command when the individual is not the user.

The profile engine 360 is also configured to identify the attributes or characteristics of a user (e.g., width of arm, length of torso, etc.), sound of the user's voice, skin color, birthmarks, or other identifying characteristics. For example, the profile engine 360 may measure the length between the elbow and hand and store the information with the profile data store 390. When a user is recognized by the computing device, the attributes associated with the user's profile may be checked to authenticate the user.

The identification of the user can help identify a performance of the user, which may be used to determine metrics associated with providing instructional content for the user. For example, the metrics can include the speed of providing instructional content. In an environment where the instructional content is displayed for the user on a screen associated with the computing device, for example, the instructional content can slow a speed of a video or repeat portions of the video for a user that may need more time with the instructional content.

In another example, the duration for accepting the information content may be altered. In a testing environment, for example, the user may be given more time to answer a test question when the profile identifies a user as needing more time to provide the answer (e.g., the user spells out each letter using American Sign Language may need more time to complete an essay question than someone typing). In other examples, the user may need more time to understand the test question based on a learning disability, so the duration of the test may be extended for the user in order to provide the three-dimensional input.

The metrics can also include a customized method of providing the informational content (e.g., audio, visual, etc.) or other customizations based on a user's profile and/or various limitations. For example, the user may be given more time to read through and understand a lesson when the instructional content associated with the lesson is spoken to the user instead of simply displayed.

The profile engine 360 is also configured to update an identification of a user. For example, the user may start with a particular disability and improve or decline over time. The profile engine 360 can correlate the changes with providing instructional content at a different speed, allowing an extended or restricted period for the test answers, and other corresponding adjustments.

The profile engine 360 is also configured to determine one or more default or first profiles. The first profile correlates the three-dimensional input from any user with a plurality of commands. For example, when a user uses an appendage to point at a computing device, the first profile determines that the motion corresponds with the "play" command. The first profile may not take into account customizations associated with a particular user, which may be reflected in the second profile. In some examples, the first profile can correlate with a group of users (e.g., any users that are missing the use of a limb) and the second profile may correlate to a particular user.

The profile engine 360 is also configured to generate a second profile from the first profile. The commands in the first profile may be used as the commands associated with the second profile until the commands are changed for a particular user. In some examples, the second profile maybe be based in part on the first profile.

In some examples, the profile engine identifies a profile for a particular affliction or disability (used interchangeably). For example, the user may self-identify as deaf and the profile can associate the three-dimensional input with visual commands and feedback. In another example, the user may self-identify as blind and the profile can associate the three-dimensional input with audible commands and feedback. In some examples, the user may work with another individual that assists the user in providing three-dimensional input or helps the user instruct the computing device how to correlate the three-dimensional input with particular commands.

The profile engine 360 is also configured to authenticate a user. For example, the profile engine 360 can determine that a particular individual is a particular user by analyzing the three-dimensional input provided via the computing device 120. As an illustration, the profile associated with the user can identify the user as having purple skin and fail to authenticate another user if they do not have the same color skin (e.g., through visual color recognition by a sensor associated with the computing device). The profile may also identify the user by unique shapes of the user's appendages, missing appendages, or other physical identification that correlate with a particular user with a profile.

In some instances, the computing device can filter three-dimensional input from sources that are not the user. For example, an individual with blue skin will not be recognized when the user has purple skin in the profile. In another example, the computing device will receive the three-dimensional input from the individual with blue skin and remove any commands associated with the three-dimensional input (e.g., filtering).

The filtering may be based on the type of image data the computing device receives. For example, in the example of blue and purple skin, the sensor or camera associated with the computing device may receive ultraviolet light data in order to sense colors (e.g., red, orange, yellow, green, blue, indigo, and violet). In another example, when infrared data is received, the computing device would filter inanimate objects from the three-dimensional input (e.g., only accept red-colored objects by heat).

The computing device may recognize only three-dimensional input from a single individual based on physical possibilities of movements from a single individual. For example, an individual is located at the south portion of the computing device. A hand movement that originates or enters a viewable area from a northern portion of the computing device can be filtered. The three-dimensional input from the northern portion is more than likely from a second individual instead of the user, which may be common in a classroom setting with several individuals in a relatively small space next to the computing device. The filter may also filter appendages from various angles, sources, or other methods that do not correspond with known physical limitations of a user.

The filter may also remove three-dimensional input based in part on the profile. For example, the profile may identify a user with only one finger. When the three-dimensional input originates from a user with five fingers, the three-dimensional input may not be accepted from the user and filtered as a command for the instructional content. In other examples, the three-dimensional input may be filtered with the dimensions of the user's hand/appendages do not match the dimensions in the profile or other visual distinctions that can be identified with the three-dimensional input (e.g., range of motion, shaking, stuttering, skin color/attributes, etc.).

The computing device 120 also interacts with one or more data stores, including an input data store 370, feedback data store 380, and profile data store 390. The data stores are associated with a distributed or local data system accessible by the computing device 120. For example, the engines or modules provided by the computing device 120 (e.g., input engine 310, command engine 320, output engine 330, feedback engine 340, tolerances engine 350, or profile engine 360) provide requests for information that may be stored in one or more of the data stores.

The input data store 370 receives three-dimensional input from a user. For example, the three-dimensional input can include a movement, including a start of a movement (e.g., starting at the top of a screen of a computing device) and an end of a movement (e.g., ending at the bottom of a screen of a computing device). The three-dimensional input may be generated by an appendage of a user. In some examples, absolute values associated with the three-dimensional input are stored with the input data store 370.

The feedback data store 380 receives images/video, sounds, text, and other feedback to provide to the user in response to three-dimensional input. For example, the feedback data store 380 can store the word "play," a ding sound associated with the word "play," an image of a green arrow symbolizing a "play" button, etc. One of more of these options can be associated with the "play" command and the three-dimensional input the user provides to instruct the computing device to play the instructional content.

The feedback data store 380 may also store a history of feedback. The history of feedback can be analyzed by the feedback engine 340 to determine patterns associated with the three-dimensional input. For example, a user selects an "undo" option when a particular command is associated with a particular three-dimensional input. The feedback engine 340 can recognize the user's intended command (e.g., by recognizing a pattern in the history) and update the profile to correspond with that intention.

The profile data store 390 receives information for a default or first profile. For example, the profile data store 390 may include three-dimensional input and a corresponding command to initiate when the three-dimensional input is received. In another example, the profile can include an identification of the three-dimensional input and a corresponding command for users with a particular disability (e.g., a pre-defined profile for any user that does not have an arm).

The profile data store 390 also receives information about a user to generate a second profile. The profile data store 390 can include an identification of any disabilities, limitations, afflictions, or other information that may help correlate three-dimensional input with a command. In some examples, the profile data store 390 can also identify the user by an identifier, name, or other attribute.

Figure 4:
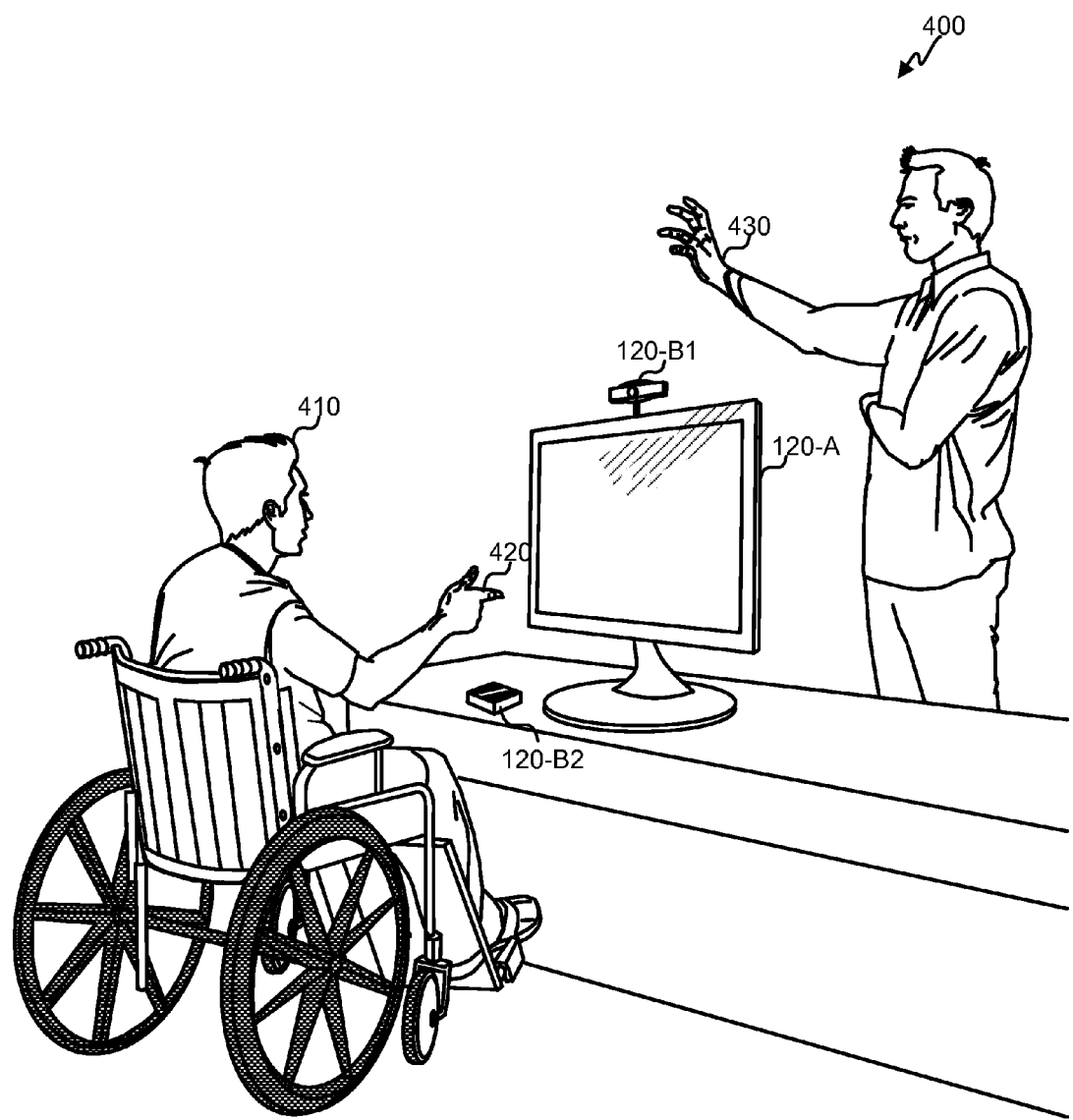
FIG. 4 illustrates an example environment for providing customized instructional content and/or feedback through an application using three-dimensional input described herein, according to at least one example.

With reference now to FIG. 4, an example environment for providing customized instructional content and/or feedback through an application using three-dimensional input is shown. For example, the environment 400 includes a first computing device 120-A, a second computing device 120-B (illustrated alternative implementations 120-B1 and 120-B2), and a user 410. The user is providing three-dimensional input using an appendage 420 and pointing at the screen associated with the computing device 120-A. In some examples, the first computing device 120-A and a second computing device 120-B are the same computing device 120 or separate computing devices (e.g., detachably coupled, attached, soldered, placed on top of, etc.).

The second computing device 120-B1 and 120-B2 includes two examples of a second computing device that may be implemented with the system. For example, second computing device 120-B1 is intermittently coupled with first computing device 120-A so that the second computing device 120-B1 remains relatively stationary with respect to the first computing device 120-A. In another example, the second computing device 120-B2 may be detached from first computing device 120-A. The second computing device 120-B2 may lay on a surface relatively close to the first computing device 120-A. The second computing devices may include one or more sensors, cameras, microphones, processors, data stores, or other devices to track a movement in substantially real-time.

In some examples, the second computing device includes one or more components, including a sensor, a projector, or camera (e.g., infrared (IR) video graphics array (VGA) camera). The projector can provide a laser across an area of view (e.g., cone) and the sensor or camera can separate the user from background images by using a depth field. The sensor or camera may use infrared and/or heat sensors to measure the difference between the user and other objects in the visible area. The measurements may also appear in colors, including a user that appears as a shade of red or green and other objects that appear grey.

When the user 410 points, the second computing device 120-B can receive three-dimensional input. For example, the second computing device 120-B can recognize the user, an appendage of the user, absolute value location of the finger, or other information. The appendage 420 can start a motion by pointing at the second computing device 120-B, move closer to the computing device, then move farther from the computing device, and end the motion in the same (or different) location where the finger started. The combination of movements can comprise the movement, including a start of the movement and an end of the movement to create the three-dimensional input.

A profile may be generated for the user 410. For example, the user 410 or another individual 430 (an entity) may assist the user in providing three-dimensional input in response to a series of steps. The three-dimensional input can identify what the user can do in terms of movements and help instruct the application on the capabilities, limitations, or disabilities of the user. The user 410 or another individual 430 may assist the user in associating the three-dimensional input with commands to provide to the computing device (e.g., to operate an application on the computing device).

The profile may be created in response to one or more prompts. For example, a series of prompts may be displayed for the user 410 or another individual 430 (e.g., to prompt the user for three-dimensional input). A particular prompt can be selected from the series of commands (e.g., checkbox, radio button, etc.) and the user can provide three-dimensional input to correlate with the selected prompt. For example, the user may select the "play" prompt that is originally associated with a pointing finger at the computing device (e.g., pre-defined three-dimensional input). When the user does not have the dexterity to point at the computing device, the user may alternatively move a first toward the computing device, which can be stored with the profile for the user. The prompt can help initiate the receipt of three-dimensional input from the user (e.g., "please provide a play command") and/or correlate a particular command with the received three-dimensional input (e.g., finger pointing corresponds with the play command that the user was prompted to provide).

In some examples, three-dimensional input from sources other than the user can be filtered. As illustrated, the other sources can include another individual 430 that provides movements to the second computing device 120-B. The additional movement from another individual 430 may be removed from the three-dimensional input and/or not used to identify a corresponding command.

When implemented as separate computing devices, the second computing device 120-B can provide the three-dimensional input (e.g., as a complete movement) to the first computing device 120-A. The first computing device 120-A can analyze the three-dimensional input and determine a command that is associated with the three-dimensional input. In some examples, the computing device 120 can wait for a complete movement (e.g., a pre-determined amount of time, until the movement stops, until a complete movement is recognized, etc.).

The first computing device 120-A can also provide feedback to the user. For example, the feedback would replay the movement provided by the user (e.g., in a wire frame), provide a text description of the command that is associated with the three-dimensional input, show an icon/image associated with the command, an audible feedback that explains the command or the three-dimensional input associated with the user's movement, or other feedback described herein.

In an illustrative example, the user 410 and another individual 430 may generate a profile for the user with the computing device. The first computing device 120-A can store the profile. At a later time, the user 410 may provide three-dimensional input using their appendage 420 to point at the computing device 120-B. The second computing device 120-B would receive the three-dimensional input and transmit the three-dimensional input and/or recognized command to the first computing device 120-A. The first computing device 120-A can receive the profile, determine that the three-dimensional input corresponds with the profile, and identify the user as being blind based on their corresponding profile. The first computing device 120-A can also compare the received three-dimensional input with stored three-dimensional input in the profile. The three-dimensional input (pointing) can correspond with opening an electronic file for a lesson about electricity. The first computing device 120-A can play an audio file that states "command received to open a lesson file" as feedback. The first computing device 120-A can also initiate a command to open the electronic file and provide the file for the user. In this example, since the user is blind, the first computing device 120-A may audibly provide the text to the user through speakers coupled with the first computing device 120-A.

Figure 5:
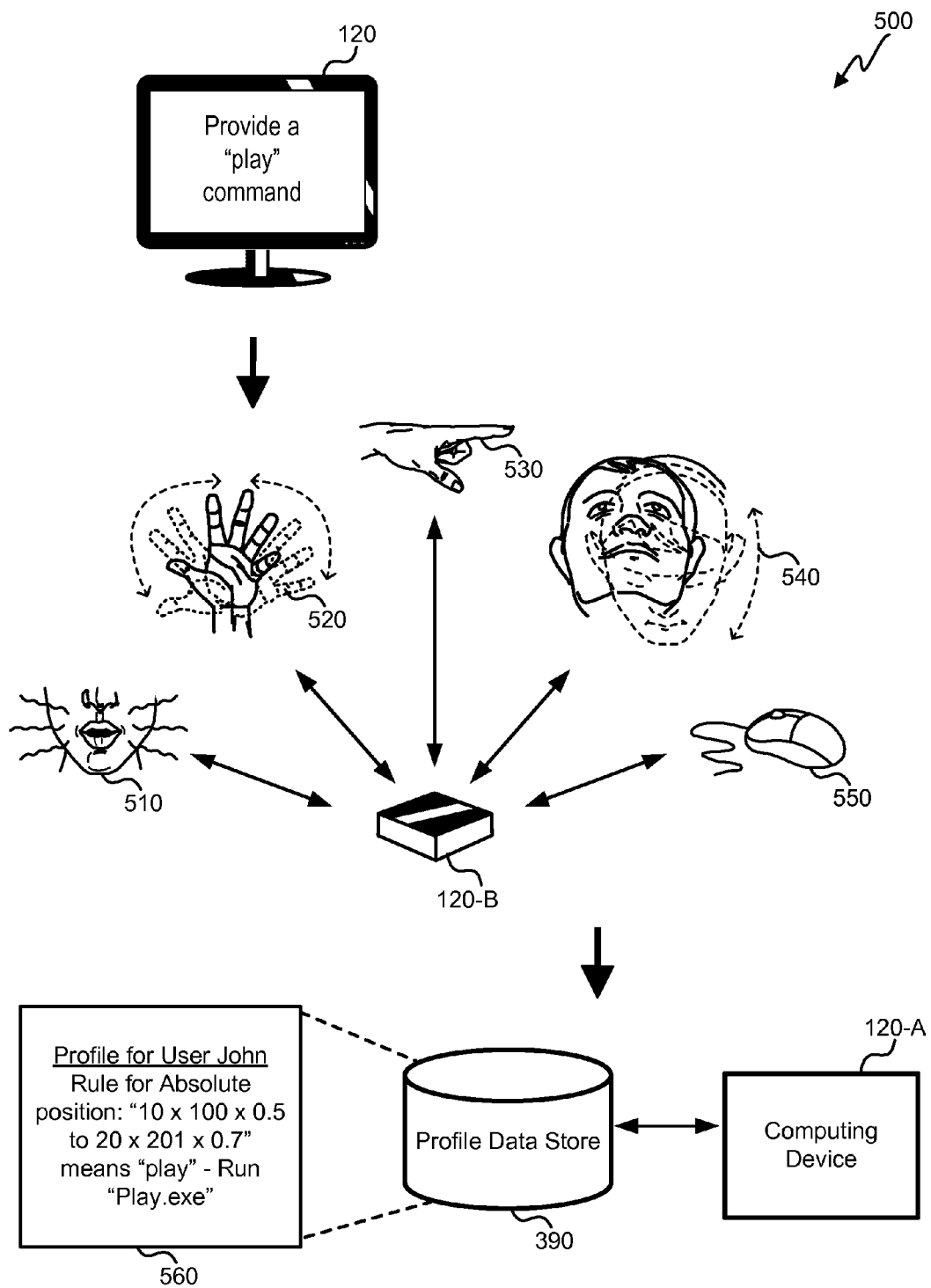
FIG. 5 illustrates an illustrative flow for customizing an application using three-dimensional input and generating a profile described herein, according to at least one example.

With reference now to FIG. 5, an illustrative flow for customizing an application using three-dimensional input and generating a profile is shown. For example, the flow 500 includes a first computing device 120-A that prompts a user to provide a play command. The first computing device 120-A can include a screen 120-C associated with the first computing device 120-A to display the prompt for the user. In some examples, the user will not be prompted to provide the three-dimensional input.

The user may then provide three-dimensional input to the computing device (e.g., the second computing device 120-B). In one example 510, the user moves their mouth, blows, breathes, or speaks to provide the three-dimensional input. In another example 520, the user waves or moves one or more appendages (e.g., a hand) to provide the three-dimensional input. In yet another example 530, the user points one or more fingers. In still another example 540, the user nods or otherwise moves their head. In another example 550, the user operates a device (e.g., a mouse, monitor, keyboard, wheelchair tray, or other assistive technology) to provide the three-dimensional input through the device.

The computing device can determine that the three-dimensional input corresponds with a command and generate a profile 560 that corresponds with the user. For example, the profile 560 can define the three-dimensional input and/or movement by an appendage of the user (e.g., rule for absolute position: "10×100×0.5 to 20×201×0.7"), a command (e.g., means "play"), and/or an action (e.g., run "Play.exe"). The computing device 120-A may store the profile for the user in the profile data store 390.

In some examples, the profile associated with the user is based in part on another profile (e.g., a first profile, a default profile, etc.) and the generated profile is a second profile. The first profile can correspond with a plurality of users and comprise a plurality of commands associated with three-dimensional input. The second profile can associate three-dimensional input that may be customized for the user that might not correspond with the rest of the users.

Figure 6:
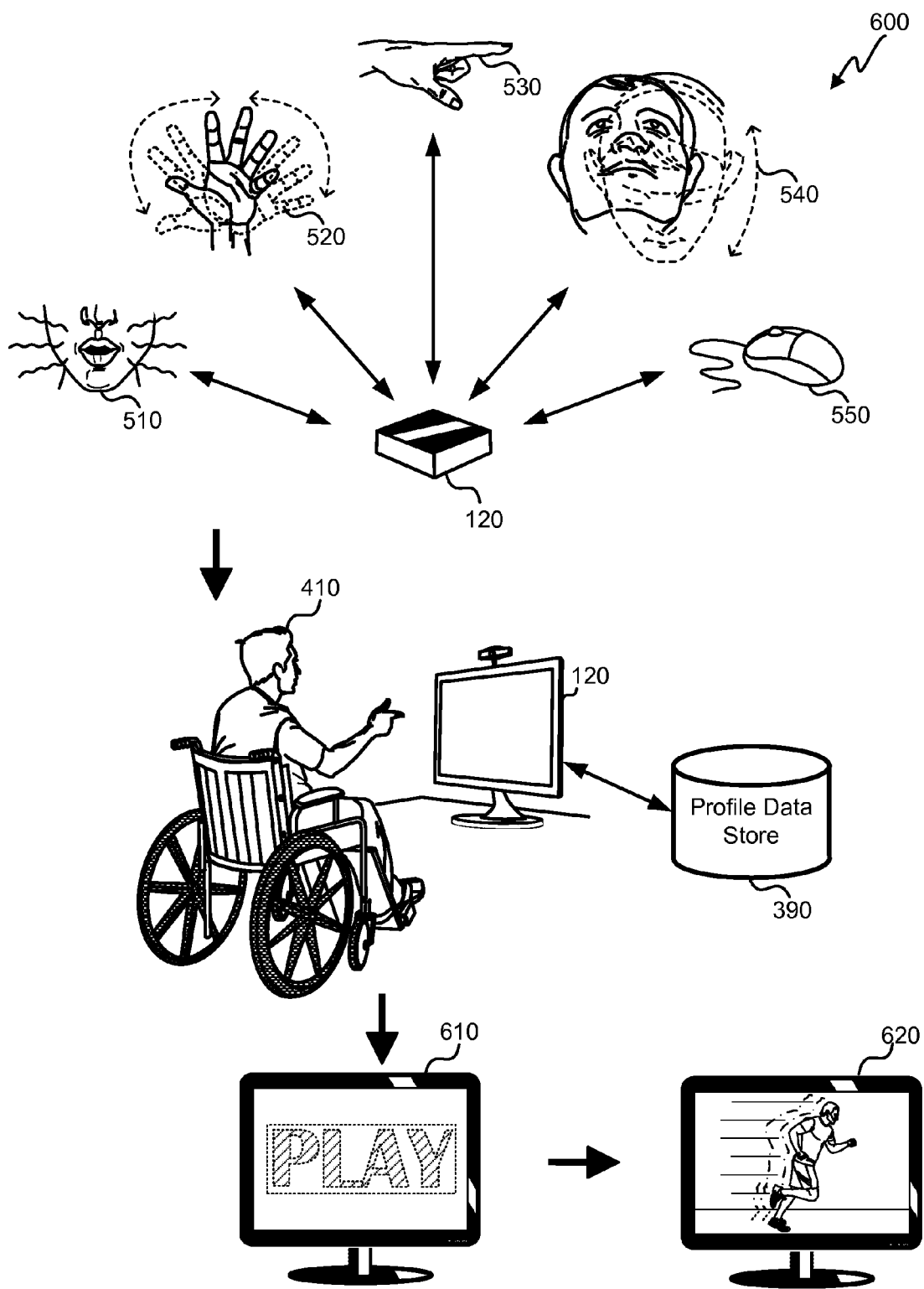
FIG. 6 illustrates an illustrative flow for providing three-dimensional input associated with a profile and pre-defined three-dimensional input described herein, according to at least one example.

With reference now to FIG. 6, an illustrative flow for providing three-dimensional input associated with a profile and pre-defined three-dimensional input is shown. For example, the flow 600 includes a user providing three-dimensional input to the computing device (e.g., the second computing device 120-B). In one example 510, the user moves their mouth, blows, breathes, or speaks to provide the three-dimensional input. In another example 520, the user waves or moves one or more appendages (e.g., a hand) to provide the three-dimensional input. In yet another example 530, the user points one or more fingers. In still another example 540, the user nods or otherwise moves their head. In another example 550, the user operates a device (e.g., a mouse, monitor, keyboard, wheelchair tray, or other assistive technology) to provide the three-dimensional input.

The computing device 120 may receive a profile for the user 410 that provides the three-dimensional input. In some examples, the profile is received from the profile data store 390. The computing device can determine that the three-dimensional input corresponds with the profile for a particular user.

When the profile is identified, the pre-defined three-dimensional input associated with the profile (e.g., stored input) can be compared with the three-dimensional input provided by the user (e.g., input received in real-time). In some examples, a command is identified that is associated with the three-dimensional input provided by the user.

The computing device can provide feedback 610. The feedback may confirm that the three-dimensional input provided by the user corresponds with the pre-defined three-dimensional input (e.g., the three-dimensional input stored with the user's profile, the three-dimensional input associated with a particular command, etc.). For example, the feedback can include a visual representation of the word "play" that fades after a few seconds.

After the feedback 610 is provided, the application may perform some action 620. For example, when the three-dimensional input is associated with command "play," the feedback includes the word "play," and the application begins to play the instructional content video for the user. In some examples, the action 620 is also adjusted in response to the user's profile or other customizations for the user.

With reference now to FIG. 7, examples of instructional content are shown. For example, the illustration 700 includes a portion of a multiple choice test 710, instructions for customizing a profile associated with receiving the instructional content 720, an application that performs word predictions 730, or animated images in the instructional content 740.

With reference now to FIGS. 8A, 8B, and 8C, examples of feedback are shown. For example, FIG. 8A includes an illustration of visual feedback. The feedback 810 may include a textual representation of a command associated with the three-dimensional input. The feedback may appear and fade after an amount of time. As illustrated, the three-dimensional input represents a "play" command and the feedback 810 shows the word "play" as feedback.

FIG. 8B includes another illustration of visual feedback. The feedback 820 may include an image or icon of a representation of a command associated with the three-dimensional input. As illustrated, the three-dimensional input represents a "play" command and the feedback 820 shows a play icon. The feedback 820 may be included in a status bar shown on a display associated with the computing device (e.g., in the corner of a screen).

FIG. 8C includes an illustration of audio feedback. The audio feedback can be provided through the computing device and/or a peripheral computing device (e.g., speakers associated with the computing device). As illustrated, the three-dimensional input represents a "play" command and the feedback would audibly provide the word "play" or some other confirmation that the "play" command has been recognized (e.g., "Command complete. Your instructional content will soon begin.").

Figure 9:
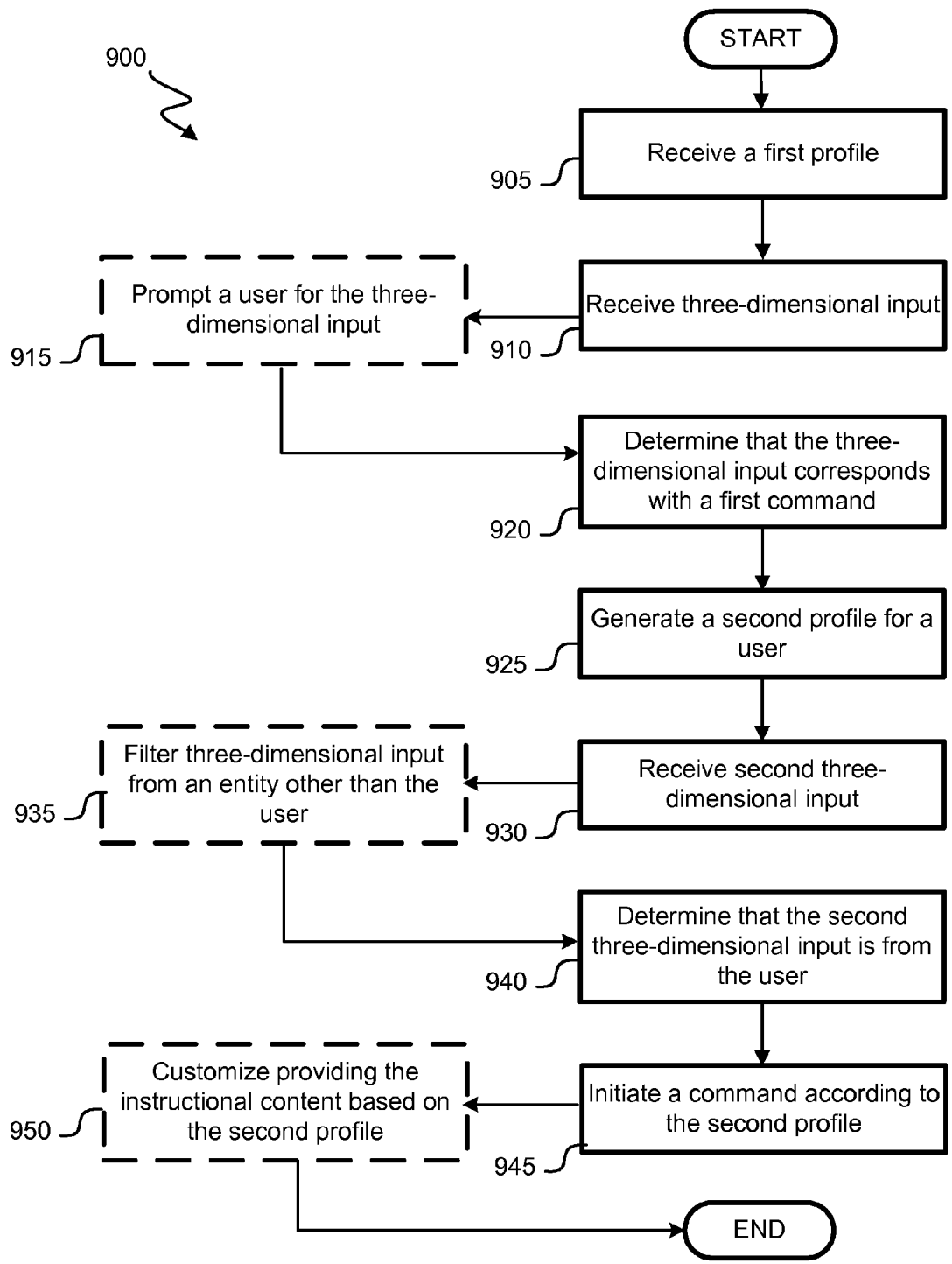
FIG. 9 illustrates a flowchart for providing customized instructional content and/or feedback through an application using three-dimensional input described herein, according to at least one example.

With reference now to FIG. 9, a flowchart illustrating one embodiment of providing customized instructional content and/or feedback through an application using three-dimensional input is shown. The process 900 is performed by one or several of the components of the system 100. The process 900 begins at block 905 when a first profile is received. The first profile may be a default profile and/or a profile associated with one or more users.

At block 910, three-dimensional input is received. The three-dimensional input can include various forms of data, including a wire-frame that replicates a movement of an appendage of the user, one or more absolute values of an appendage of the user in space, identifying characteristics of the user, or other information.

At block 915, a user is optionally prompted for three-dimensional input. For example, the computing device may audibly or visually request that the user provides three-dimensional input for a play command, as illustrated in FIG. 5. The prompt can help initiate the receipt of three-dimensional input from the user (e.g., "please provide a play command") and/or correlate a particular command with the received three-dimensional input (e.g., finger pointing corresponds with the play command that the user was prompted to provide).

At block 920, the three-dimensional input is determined to correspond with a first command. For example, the three-dimensional input includes pointing at a screen associated with the computing device. The three-dimensional input may correspond with the first profile to identify a particular command. For example, the command may include playing a video file.

At block 925, a second profile is generated for a user. For example, the second profile can include one or more commands from the first or default profile. This may include when the user identifies a new three-dimensional input for a play command but keeps the default three-dimensional input for a stop command. When the user provides the new three-dimensional input, the new three-dimensional input can replace the stored three-dimensional input that was originally associated with the first command.

At block 930, a second three dimensional input is received. For example, the second three-dimensional input includes new three-dimensional input provided by the user, after the computing device associated the new three-dimensional input with the command in the second profile. The computing device can identify the second three-dimensional input in much the same way as the computing device identified the first three-dimensional input, including using a sensor, a projector, camera, field of view analysis, and the like.

At block 935, three-dimensional input is optionally filtered from an entity other than the user. For example, as illustrated in FIG. 4, another user may assist the user in providing three-dimensional input. In other examples, other students in a classroom, inanimate objects, or other items that move can interfere with the three-dimensional input that the user is providing. The additional three-dimensional input may be filtered (e.g., removed) so that the three-dimensional input is only provided by the user.

At block 940, the second three-dimensional input is determined to be from the user. For example, the user may be authenticated by analyzing the received three-dimensional input. As an illustration, the profile associated with the user can identify the user as having purple skin and fail to authenticate another user if they do not have the same color skin (e.g., through visual color recognition by a sensor associated with the computing device). The profile may also identify the user by unique shapes of the user's appendages, missing appendages, or other physical identification that correlate with a particular user with a profile. In other examples, the user may provide an identifier or other login credentials to identify that the three-dimensional input is being received from the user.

At block 945, a command is initiated according to the second profile. For example, when a user is authenticated and the command instructs the computing device to provide a lesson on electricity, the network interface transmits the instructional content (e.g., test questions, lesson plans, instructions, learning materials, etc.) to the computing device in response to the command.

At block 950, the instructional content is optionally customized based on the second profile. For example, when the user is blind, the instructional content may be audibly provided. When the user is deaf, the instructional content may be visually provided. In an instructional environment, including a testing environment, the instructional content may be slowed or enlarged to correspond with the user's profile. In some examples, a user may be provided more (or less) time to complete a test, corresponding to the user's profile.

Figure 10:
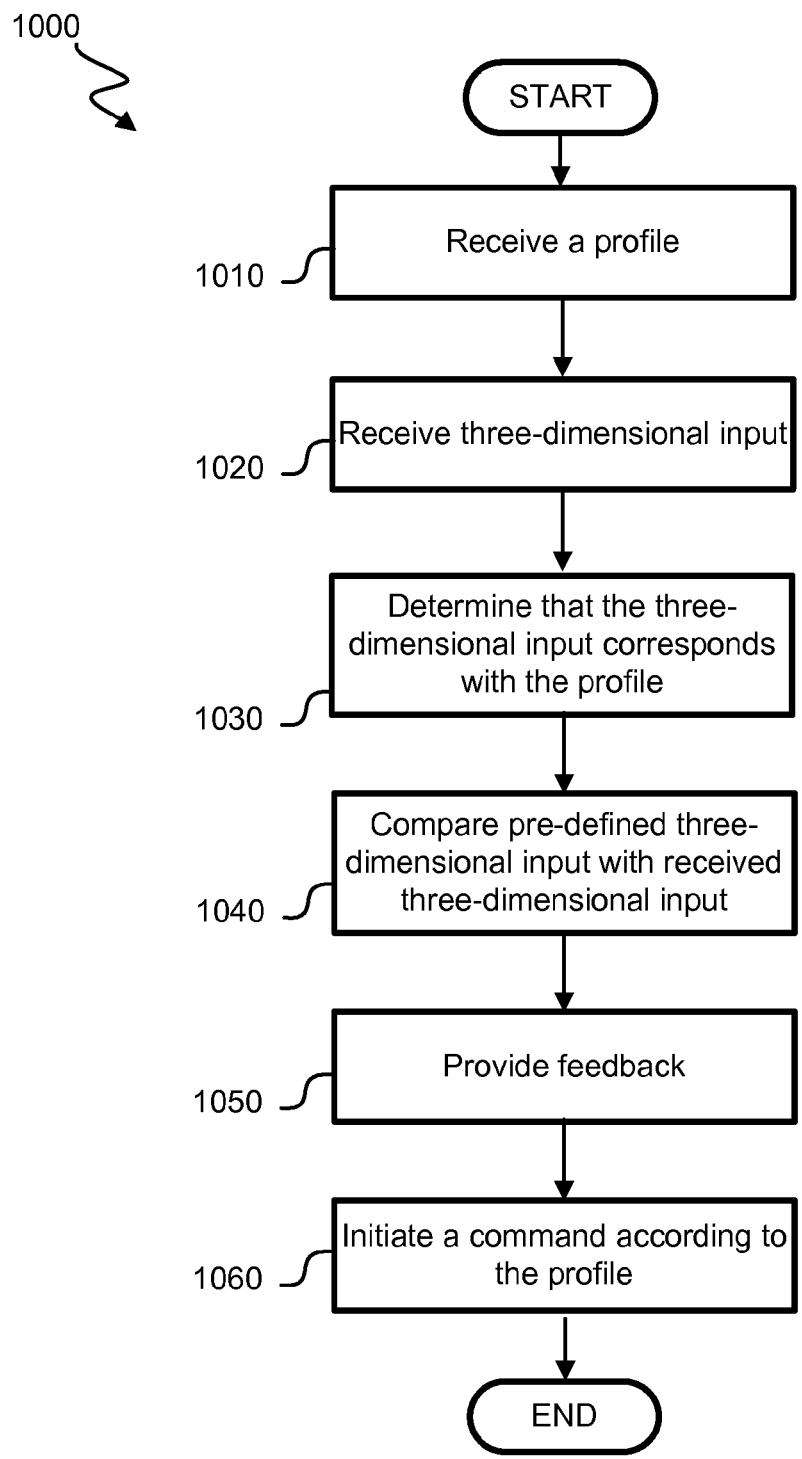
FIG. 10 illustrates a flowchart for providing customized instructional content and/or feedback through an application using three-dimensional input described herein, according to at least one example.

With reference now to FIG. 10, a flowchart illustrating one embodiment of providing customized instructional content and/or feedback through an application using three-dimensional input is shown. The process 1000 is performed by one or several of the components of the system 100. The process 1000 begins at block 1010 when a profile is received. For example, the profile may be stored in profile data store or received from a second computing device. At block 1020, three-dimensional input is received.

At block 1030, the three-dimensional input is determined to correspond with the profile. For example, the user may be authenticated or otherwise identified by the computing device. The profile associated with the user or a default profile can include pre-defined three-dimensional input that would correspond with a command.

At block 1040, pre-defined three-dimensional input is compared with the received three-dimensional input. For example, the pre-defined three-dimensional input may include three fingers pointing at a computing device. The received three-dimensional input may include two fingers pointing at the computing device. When compared, the three-dimensional input may be different. In another example, the pre-defined three-dimensional input and received three-dimensional input may be substantially similar.

At block 1050, feedback is provided. For example, when the pre-defined three-dimensional input and received three-dimensional input are different, the feedback can include a notification to the user that the received three-dimensional input is not recognized as three-dimensional input stored with the profile. The notification may request that the user provides new three-dimensional input. When the pre-defined three-dimensional input and received three-dimensional input are substantially similar, the notification may confirm the command that corresponds with the received three-dimensional input (e.g., "you provided the three-dimensional input for 'play' so we will play your instructional content").

At block 1060, a command is initiated according to the profile. For example, the instructional content may begin to play. In some examples, the initiated command may begin after the feedback is provided to the user.

Figure 11:
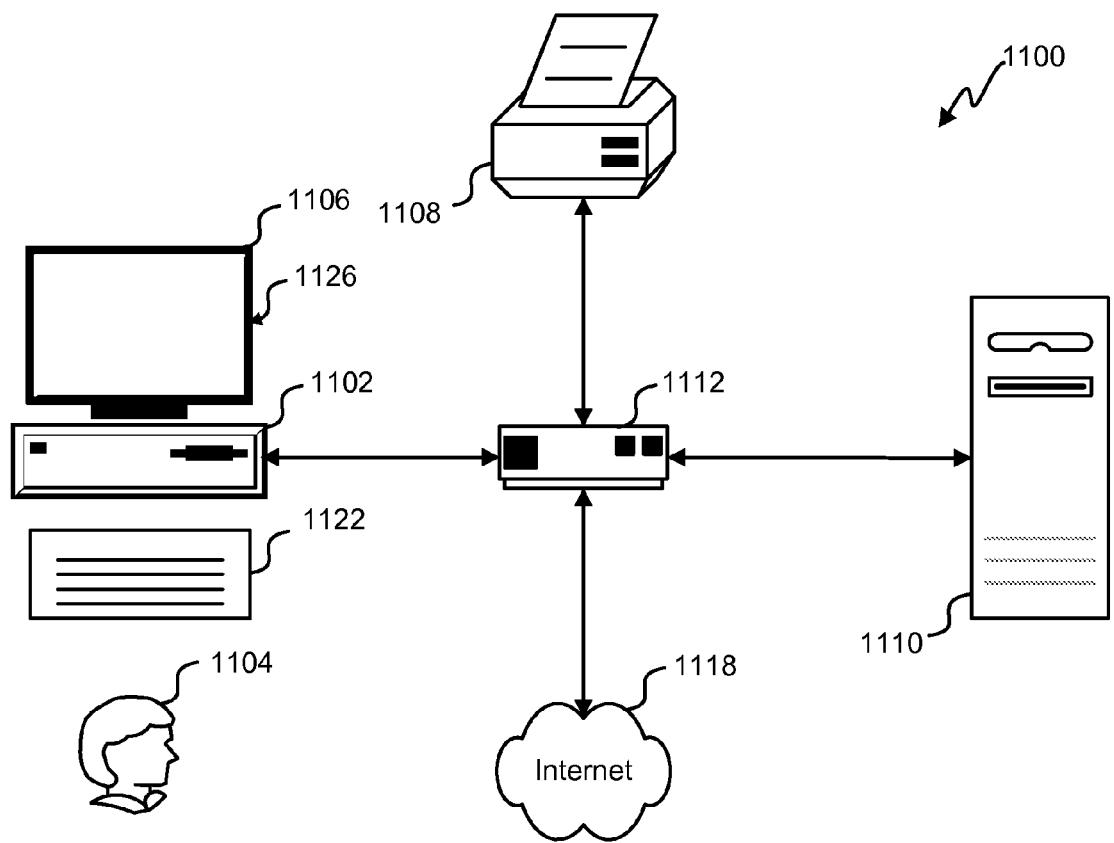
FIG. 11 illustrates an example environment for providing customized instructional content through an application using three-dimensional input described herein, according to at least one example.

With reference now to FIG. 11, an exemplary environment with which embodiments may be implemented is shown with a computer system 1100 that can be used by a user 1104 as all or a component of the system 100. The computer system 1100 can include a computer 1102, keyboard 1122, a network router 1112, a printer 1108, and a monitor 1106. The monitor 1106, processor and keyboard 1122 are part of a computer system 1126, which can be a laptop computer, desktop computer, handheld computer, mainframe computer, etc. The monitor 1106 can be a CRT, flat screen, etc.

A user 1104 can input commands into the computer 1102 using various input devices, such as a mouse, keyboard 1122, track ball, touch screen, etc. If the computer system 1100 comprises a mainframe, a user 1104 can access the computer 1102 using, for example, a terminal or terminal interface. Additionally, the computer system 1126 may be connected to a printer 1108 and a server 1110 using a network router 1112, which may connect to the Internet 1118 or a wide-area network (WAN).

The server 1110 may, for example, be used to store additional software programs and data. In one embodiment, software implementing the systems and methods described herein can be stored on a storage medium in the server 1110. Thus, the software can be run from the storage medium in the server 1110. In another embodiment, software implementing the systems and methods described herein can be stored on a storage medium in the computer 1102. Thus, the software can be run from the storage medium in the computer system 1126. Therefore, in this embodiment, the software can be used whether or not computer 1102 is connected to network router 1112. Printer 1108 may be connected directly to computer 1102, in which case, the computer system 1126 can print whether or not it is connected to network router 1112.

Figure 12:
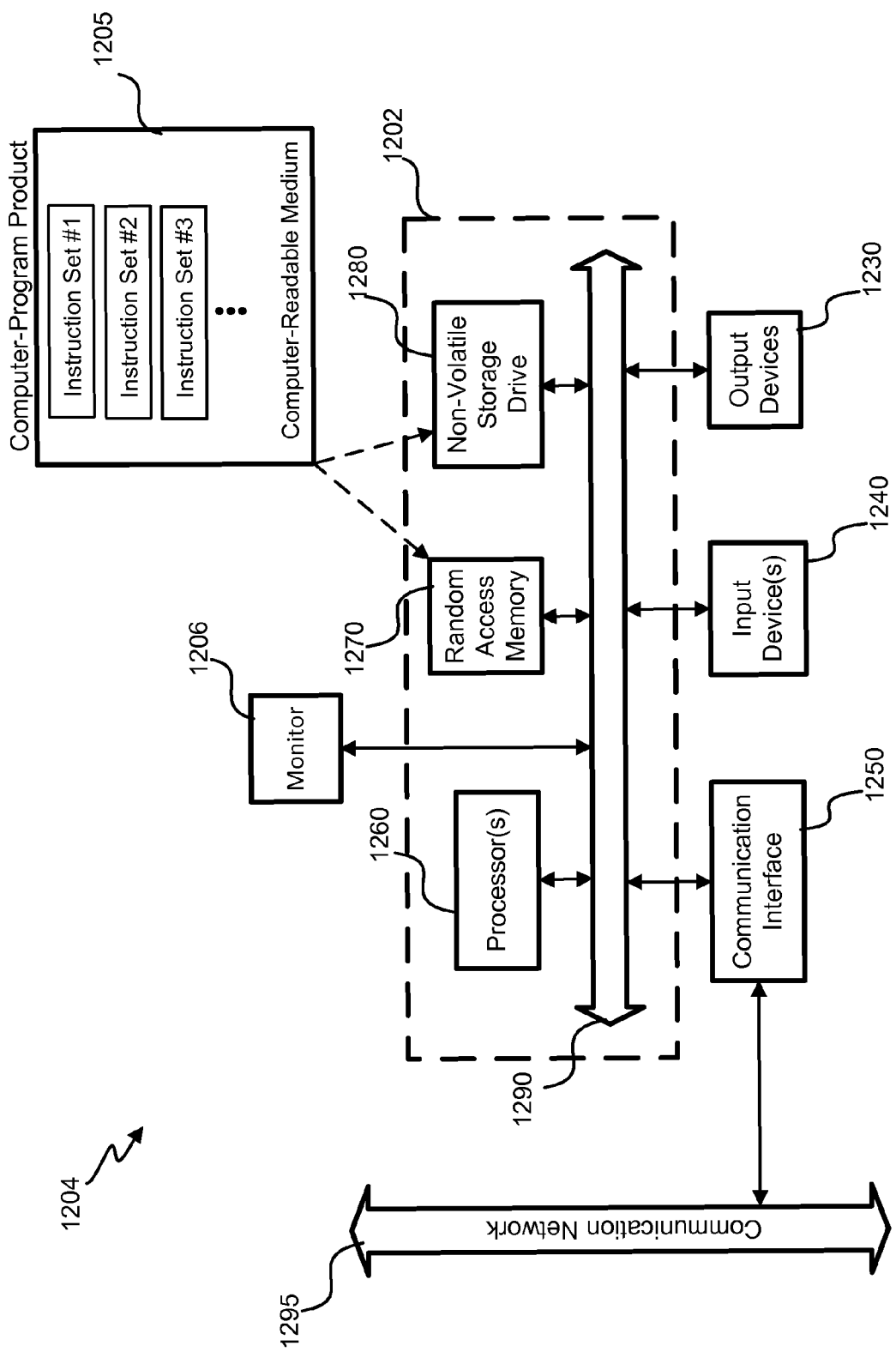
FIG. 12 illustrates an example special-purpose computer system, according to at least one example.

With reference to FIG. 12, an embodiment of a special-purpose computer system 1204 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1226, it is transformed into the special-purpose computer system 1204.

Special-purpose computer system 1204 comprises a computer 1202, a monitor 1206 coupled to computer 1202, one or more additional user output devices 1230 (optional) coupled to computer 1202, one or more user input devices 1240 (e.g., keyboard, mouse, track ball, touch screen) coupled to computer 1202, an optional communications interface 1250 coupled to computer 1202, a computer-program product 1205 stored in a tangible computer-readable memory in computer 1202. Computer-program product 1205 directs the special-purpose computer system 1204 to perform the above-described methods. Computer 1202 may include one or more processors 1260 that communicate with a number of peripheral devices via a bus subsystem 1290. These peripheral devices may include user output device(s) 1230, user input device(s) 1240, communications interface 1250, and a storage subsystem, such as random access memory (RAM) 1270 and non-volatile storage drive 1280 (e.g., disk drive, optical drive, solid state drive), which are forms of tangible computer-readable memory.

Computer-program product 1205 may be stored in non-volatile storage drive 1280 or another computer-readable medium accessible to computer 1202 and loaded into RAM 1270 or other memory. Each processor 1260 may comprise a microprocessor, such as a microprocessor from Intel® or Advanced Micro Devices, Inc.®, or the like. To support computer-program product 1205, the computer 1202 runs an operating system that handles the communications of product 1205 with the above-noted components, as well as the communications between the above-noted components in support of the computer-program product 1205. Exemplary operating systems include Windows® or the like from Microsoft® Corporation, Solaris® from Oracle®, LINUX, UNIX, and the like.

User input devices 1240 include all possible types of devices and mechanisms to input information to computer 1202. These may include a keyboard, a keypad, a mouse, a scanner, a digital drawing pad, a touch screen incorporated into the display, audio input devices such as voice recognition systems, microphones, and other types of input devices. In various embodiments, user input devices 1240 are typically embodied as a computer mouse, a trackball, a track pad, a joystick, wireless remote, a drawing tablet, a voice command system. User input devices 1240 typically allow a user to select objects, icons, text and the like that appear on the monitor 1206 via a command such as a click of a button or the like. User output devices 1230 include all possible types of devices and mechanisms to output information from computer 1202. These may include a display (e.g., monitor 1206), printers, non-visual displays such as audio output devices, etc.

Communications interface 1250 provides an interface to other communication networks 1295 and devices and may serve as an interface to receive data from and transmit data to other systems, WANs and/or the Internet. Embodiments of communications interface 1250 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1250 may be coupled to a computer network, to a FireWire® bus, or the like. In other embodiments, communications interface 1250 may be physically integrated on the motherboard of computer 1202, and/or may be a software program, or the like.

RAM 1270 and non-volatile storage drive 1280 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only memories (ROMs), battery-backed volatile memories, networked storage devices, and the like. RAM 1270 and non-volatile storage drive 1280 may be configured to store the basic programming and data constructs that provide the functionality of various embodiments of the present invention, as described above.

Software instruction sets that provide the functionality of the present invention may be stored in RAM 1270 and non-volatile storage drive 1280. These instruction sets or code may be executed by the processor(s) 1260. RAM 1270 and non-volatile storage drive 1280 may also provide a repository to store data and data structures used in accordance with the present invention. RAM 1270 and non-volatile storage drive 1280 may include a number of memories including a main random access memory (RAM) to store of instructions and data during program execution and a read-only memory (ROM) in which fixed instructions are stored. RAM 1270 and non-volatile storage drive 1280 may include a file storage subsystem providing persistent (non-volatile) storage of program and/or data files. RAM 1270 and non-volatile storage drive 1280 may also include removable storage systems, such as removable flash memory.

Bus subsystem 1290 provides a mechanism to allow the various components and subsystems of computer 1202 communicate with each other as intended. Although bus subsystem 1290 is shown schematically as a single bus, alternative embodiments of the bus subsystem may utilize multiple busses or communication paths within the computer 1202.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read-only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computing device for providing customized instructional content through an application using three-dimensional input, the computing device comprising:
   a processor; and
   a memory device including instructions that, when executed by the processor, cause the processor to:
     receive a first profile, wherein:
       the first profile is associated with a plurality of users,
       the first profile comprises a plurality of commands associated with the three-dimensional input,
       the plurality of commands includes a first command and a second command, and
       the plurality of commands interact with the instructional content;
     receive the three-dimensional input, wherein:
       the three-dimensional input is provided by an appendage of a user,
       the appendage of the user moves in a three-dimensional space to generate the three-dimensional input, and
       the movement includes a start of the movement by the appendage and an end of the movement by the appendage;
     determine that the three-dimensional input corresponds with the first command;
     generate a second profile for the user, wherein:
       at least one of the commands from the plurality of commands associated with the first profile is also associated with the second profile,
       the second profile corresponds with the user, and
       the three-dimensional input replaces information in the second profile that was originally associated with the first command in the first profile;
     receive a second three-dimensional input, wherein the first profile or the second profile comprises a duration of time for the user to attempt to provide the three-dimensional input or the second three-dimensional input;
     determine that the second three-dimensional input is from the user; and
     initiate the first command on the application according to the second profile for the user.

2. The computing device for providing customized instructional content using the three-dimensional input of claim 1, wherein a speed for providing the instructional content is reduced based on performance of the user identified in the second profile.

3. The computing device for providing customized instructional content using the three-dimensional input of claim 1, wherein a duration for providing customized instructional content through the application using the three-dimensional input is increased based on performance of the user identified in the second profile.

4. The computing device for providing customized instructional content using the three-dimensional input of claim 1, wherein the first profile is a default profile and the second profile is a customized profile.

5. The computing device for providing customized instructional content using the three-dimensional input of claim 1, wherein the instructions further cause the processor to:
   receive a third three-dimensional input, wherein:
     the third three-dimensional input includes a plurality of movements, and
     the plurality of movements include input from entities other than the user;
   filter the plurality of movements from the third three-dimensional input based on a threshold;
   determine that the filtered third three-dimensional input corresponds with the second command; and initiate the second command on the application that corresponds with the filtered third three-dimensional input.

6. The computing device for providing customized instructional content using the three-dimensional input of claim 1, wherein the three-dimensional input is received from a second computing device.

7. The computing device for providing customized instructional content using the three-dimensional input of claim 1, wherein the instructions further cause the processor to:
prompt the user to provide the three-dimensional input.

8. The computing device for providing customized instructional content using the three-dimensional input of claim 1, wherein the instructions further cause the processor to:
authenticate the user using an attribute of the user associated with the second profile, wherein the attribute is used to determine that the second three-dimensional input is from the user.

9. The computing device for providing customized instructional content using the three-dimensional input of claim 8, wherein the attribute is a physical attribute of the user that is identified by the computing device.

10. The computing device for providing customized instructional content using the three-dimensional input of claim 8, wherein the attribute is stored with the second profile.

11. The computing device for providing customized instructional content using the three-dimensional input of claim 1, wherein the processor is further caused to:
present the instructional content prior to receiving the three-dimensional input and the second three-dimensional input.

12. A non-transitory computer-readable storage medium storing computer-executable instructions that, when executed by a processor, cause the processor to perform operations for providing customized instructional content through an application using three-dimensional input, the operations comprising:
receiving a first profile, wherein:
the first profile is associated with a plurality of users,
the first profile comprises a plurality of commands associated with the three-dimensional input,
the plurality of commands includes a first command and a second command, and
the plurality of commands interact with the instructional content;
receiving the three-dimensional input, wherein:
the three-dimensional input is provided by an appendage of a user,
the appendage of the user moves in a three-dimensional space to generate the three-dimensional input, and
the movement includes a start of the movement by the appendage and an end of the movement by the appendage;
determining that the three-dimensional input corresponds with the first command;
generating a second profile for the user, wherein:
at least one of the commands from the plurality of commands associated with the first profile is also associated with the second profile,
the second profile corresponds with the user, and
the three-dimensional input replaces information in the second profile that was originally associated with the first command in the first profile;
receiving a second three-dimensional input, wherein the first profile or the second profile comprises a duration of time for the user to attempt to provide the three-dimensional input or the second three-dimensional input;
determining that the second three-dimensional input is from the user; and
initiating the first command on the application according to the second profile for the user instead of the first profile.

13. The non-transitory computer-readable storage medium storing computer-executable instructions that, when executed by the processor, cause the processor to perform operations for providing customized instructional content through the application using three-dimensional input of claim 12, wherein a speed for providing the instructional content is reduced based on the second profile.

14. The non-transitory computer-readable storage medium storing computer-executable instructions that, when executed by the processor, cause the processor to perform operations for providing customized instructional content through the application using three-dimensional input of claim 12, wherein a duration for providing customized instructional content through the application using the three-dimensional input is increased based on the second profile.

15. The non-transitory computer-readable storage medium storing computer-executable instructions that, when executed by the processor, cause the processor to perform operations for providing customized instructional content through the application using three-dimensional input of claim 12, wherein the first profile is a default profile and the second profile is a customized profile.

16. The non-transitory computer-readable storage medium storing computer-executable instructions that, when executed by the processor, cause the processor to perform operations for providing customized instructional content through the application using three-dimensional input of claim 12, the operations further comprising:
receiving a third three-dimensional input, wherein:
the third three-dimensional input includes a plurality of movements, and
the plurality of movements include input from entities other than the user;
filtering the plurality of movements from the third three-dimensional input based on a threshold;
determining that the filtered third three-dimensional input corresponds with the second command; and
initiating the second command on the application that corresponds with the filtered third three-dimensional input.

17. The non-transitory computer-readable storage medium storing computer-executable instructions that, when executed by the processor, cause the processor to perform operations for providing customized instructional content through the application using three-dimensional input of claim 12, wherein the three-dimensional input is received from a second computing device.

18. The non-transitory computer-readable storage medium storing computer-executable instructions that, when executed by the processor, cause the processor to perform operations for providing customized instructional content through the application using three-dimensional input of claim 12, the operations further comprising:
prompting the user to provide the three-dimensional input.

19. A computer-implemented method of providing customized instructional content through an application using three-dimensional input, the method comprising:
receiving a first profile, wherein:
the first profile is associated with a plurality of users,
the first profile comprises a plurality of commands associated with the three-dimensional input,
the plurality of commands includes a first command and a second command, and
the plurality of commands interact with the instructional content;
receiving the three-dimensional input, wherein:
the three-dimensional input is provided by an appendage of a user,
the appendage of the user moves in a three-dimensional space to generate the three-dimensional input, and
the movement includes a start of the movement by the appendage and an end of the movement by the appendage;
determining that the three-dimensional input corresponds with the first command;
generating a second profile for the user, wherein:
at least one of the commands from the plurality of commands associated with the first profile is also associated with the second profile,
the second profile corresponds with the user, and
the three-dimensional input replaces information in the second profile that was originally associated with the first command in the first profile;
receiving a second three-dimensional input, wherein the first profile or the second profile comprises a duration of time for the user to attempt to provide the three-dimensional input or the second three-dimensional input;
determining that the second three-dimensional input is from the user; and
initiating the first command on the application according to the second profile for the user instead of the first profile.

20. The computer-implemented method of providing customized instructional content through the application using three-dimensional input of claim 19, wherein a speed for providing the instructional content is reduced based on the second profile.

21. The computer-implemented method of providing customized instructional content through the application using three-dimensional input of claim 19, wherein pg,41 a duration for providing customized instructional content through the application using the three-dimensional input is increased based on the second profile.

22. The computer-implemented method of providing customized instructional content through the application using three-dimensional input of claim 19, wherein the first profile is a default profile and the second profile is a customized profile.

23. The computer-implemented method of providing customized instructional content through the application using three-dimensional input of claim 19, the method further comprising:
receiving a third three-dimensional input, wherein:
the third three-dimensional input includes a plurality of movements, and
the plurality of movements include input from entities other than the user;
filtering the plurality of movements from the third three-dimensional input based on a threshold;
determining that the filtered third three-dimensional input corresponds with the second command; and
initiating the second command on the application that corresponds with the filtered third three-dimensional input.

24. The computer-implemented method of providing customized instructional content through the application using three-dimensional input of claim 19, wherein the three-dimensional input is received from a second computing device.

* * * * *